(No Model.) 2 Sheets—Sheet 1.
F. ECAUBERT.
MACHINE FOR SPINNING WATCHCASES, LOCKETS, &c.
No. 531,789. Patented Jan. 1, 1895.
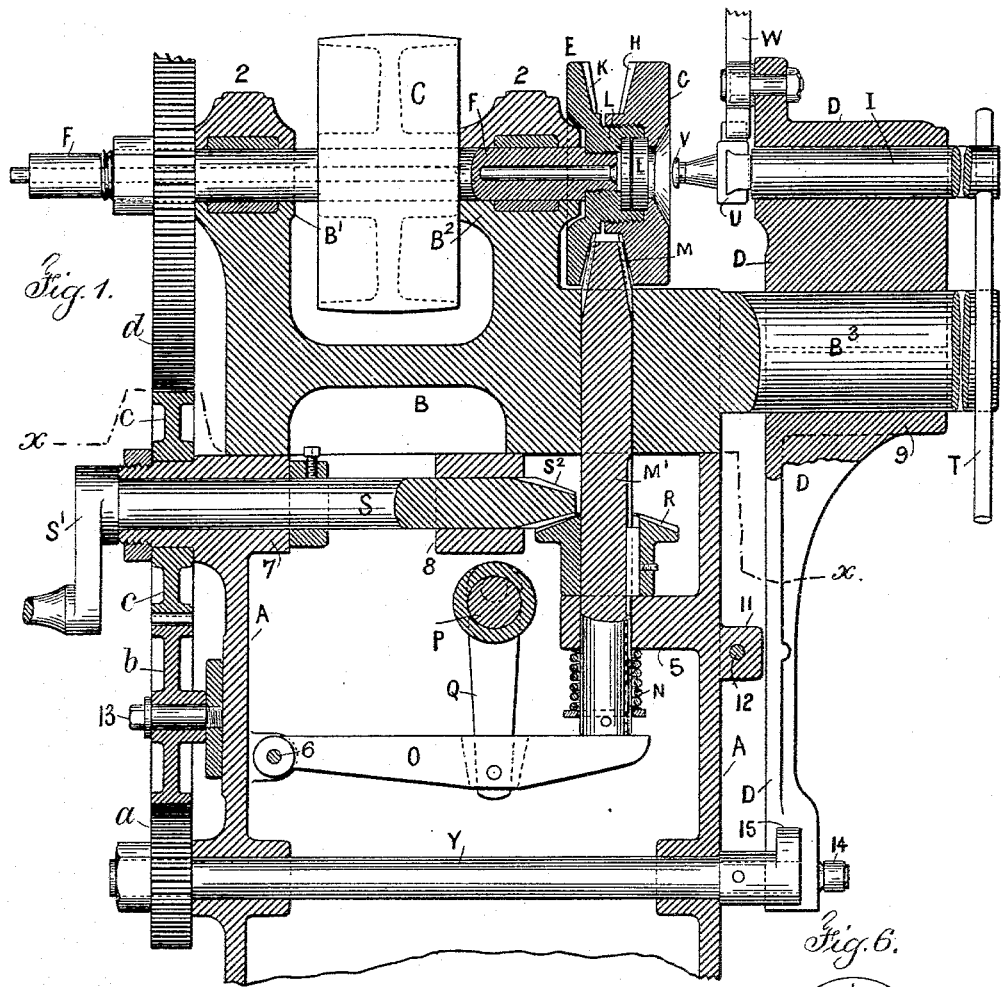
Fig. 1.
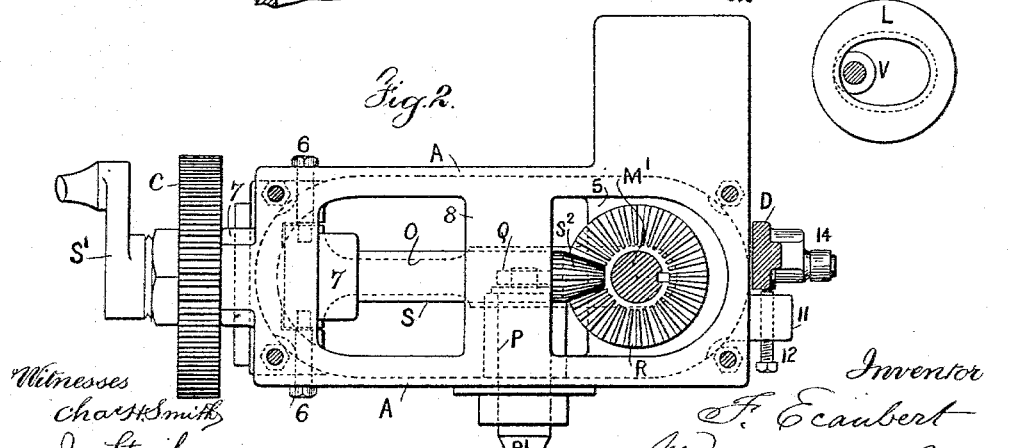
Fig. 2.
Fig. 6.
Witnesses
Chas H Smith
J. Staib
Inventor
F. Ecaubert
per Lemuel W. Serrell
Atty (No Model.) 2 Sheets—Sheet 2.
F. ECAUBERT.
MACHINE FOR SPINNING WATCHCASES, LOCKETS, &c.
No. 531,789. Patented Jan. 1, 1895.
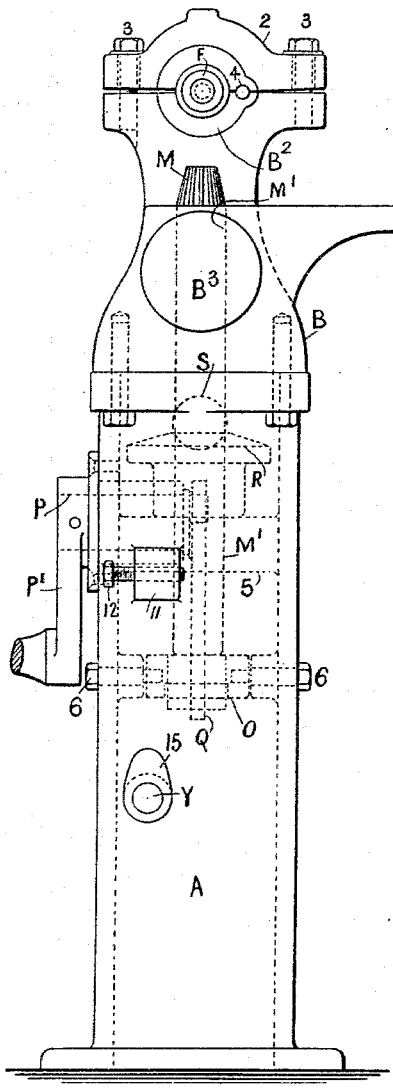
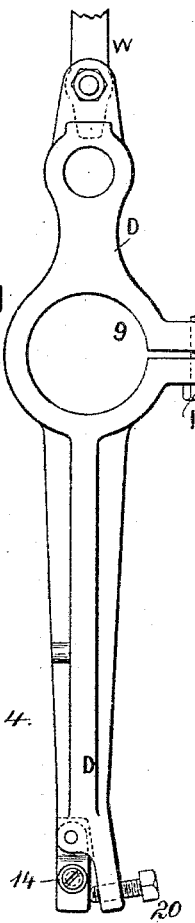
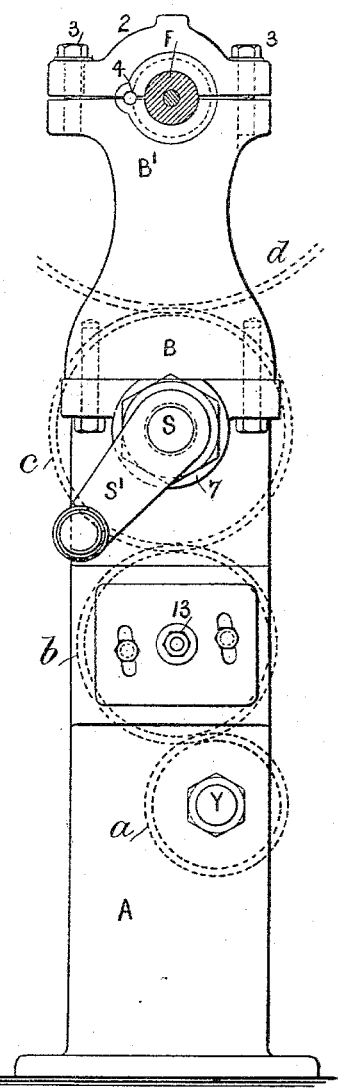
Witnesses
Chas. H. Smith
J. Staib
Inventor
F. Ecaubert
per Lemuel W. Serrell
Atty.

UNITED STATES PATENT OFFICE.

FREDERIC ECAUBERT, OF BROOKLYN, NEW YORK.

MACHINE FOR SPINNING WATCHCASES, LOCKETS, &c.

SPECIFICATION forming part of Letters Patent No. 531,789, dated January 1, 1895.

Application filed August 11, 1894. Serial No. 520,027. (No model.)

*To all whom it may concern:*

Be it known that I, FREDERIC ECAUBERT, a citizen of the United States, residing at Brooklyn, in the county of Kings and State of New York, have invented an Improvement in Machines for Spinning Watchcases, Lockets, and other Articles, of which the following is a specification.

In Letters Patent granted to me, No. 253,355, dated February 7, 1882, and No. 270,644, dated January 16, 1883, a chuck is represented with a recess for the reception of dies, such chuck being upon the end of a mandrel, and a clamping ring is screwed upon the chuck for holding the dies in position, and there are radial teeth upon the clamping ring and upon the chuck, and a pinion wrench is made use of between the parts to act upon the teeth in giving motion to the clamping ring in reference to the chuck for holding or for releasing the dies that are introduced into the recess in the chuck.

My present invention applies especially to the manufacture of watch cases, lockets, rings and similar articles that are not circular in their configuration. When a die is made use of that is adapted to such articles and the die is rotated, the roll or tool which acts upon the metal or other material to spin or shape the same to the configuration of the die, has to be moved laterally in order that the roll may follow the configuration of the interior of the article that is being produced.

In my present invention I provide for giving motion to the roll or tool within the article in respect to the die which is rotated, so that the roll follows the internal contour of the die and produces an article of uniform thickness, and the pressure itself is advantageously given by a hand lever, the parts being constructed in such a manner that the automatic mechanism causes the roll or tool to follow the contour of the external die, and the workman simply has to apply pressure to the lever, his hand remaining stationary or nearly so, and hence much more perfect work is produced than is possible where the hand of the workman has to move backward and forward in giving the movement to the internal roll to cause it to follow the contour of the internal die.

In the drawings, Figure 1 is a vertical longitudinal section through the chuck and support for the mandrel. Fig. 2 is a general plan view below the line $x$, $x$, Fig. 1. Fig. 3 is an end view with the tail-stock removed. Fig. 4 is a separate elevation of the tail-stock. Fig. 5 is an elevation at the opposite end of the machine to Fig. 3, and Fig. 6 is an elevation in larger size of the internal die and the roller or tool for acting on the article.

The base A of the machine is preferably in the form of a quadrangular box inclosing the gearing and other operative parts, and upon the top of this is the bed B hollow on the under side and provided with bearings $B'$ $B^2$ for the mandrel F. These bearings $B'$ $B^2$ are preferably provided with caps 2 held in place by the screws 3, and it is advantageous to employ a pin 4 in each bearing, such pins being parallel to the axis of rotation of the mandrel, and in half circle recesses in the top and bottom faces of the bearing and cap respectively, there being a sufficient space between the cap and the top surface of the bearing to allow for tightening the cap around the mandrel by one screw or for lessening the pressure by the other screw, the pin 4 forming a fulcrum upon which the cap can be rocked so as to adjust the caps with accuracy to allow the mandrel to be rotated freely but without any looseness.

The mandrel is to be rotated by suitable power, preferably by a pulley C for a belt. Upon the end of the mandrel F a chuck E is screwed having a recess adapted for the reception of dies L within which the article to be made is spun up by the action of suitable rolls, such for instance as those shown in either of my Patents Nos. 253,355, 426,118 and 472,490, and the clamping ring G is screwed upon the chuck E for keeping the dies together and holding them while the article is being made.

Usually it is necessary to unscrew the ring G and open the dies to a greater or less extent as each article is produced, in order that the finished article may be taken out of the dies and another blank inserted into the dies, the dies closed and the clamping ring G screwed up to place, and in order to screw up the ring G with sufficient power, teeth H are provided on the ring G and teeth K upon the chuck E, such teeth being at an inclination and adapted to receive between them the pinion wrench M, so that by rotating the pinion wrench M in one direction the clamping ring will be screwed up tightly, and when rotated in the other direction it will be unscrewed.

It is only necessary to make use of the pinion wrench M in firmly screwing the parts up or in starting the clamping ring as it is unscrewed, the remainder of the movement being advantageously given by hand. For this reason the pinion M has to be given an endwise movement to bring it up to place for use or to carry it down out of the way.

To effect the aforesaid object the shaft M' at the end of which is the pinion M is passed vertically through the bed B and through a support or bracket 5 within the base A, and there is a spring N acting against a cross pin to draw the pinion wrench M and its shaft downwardly, and a lever O for raising the same bodily into position and into gear with the teeth H and K. This lever O is acted upon by a shaft P having a crank pin or eccentric at the end acting upon a link Q pivoted at its lower end in a mortise in the lever O, such lever O being pivoted at 6.

In Fig. 1 the pinion wrench M is represented in the elevated position by the action of the crank pin on the shaft P, the spring N being compressed; and it is to be understood that the shaft P has a crank handle P' or similar device at its end outside the base A by which it is turned into position either for raising the pinion wrench or for moving the lever O away from the shaft of the pinion wrench and allowing the spring N to force such pinion wrench down out of the way of the chuck and clamping ring.

The shaft of the pinion wrench M is slotted longitudinally for the feather or key of the bevel gear R which surrounds such shaft and rests upon the bracket 5, and there is a shaft S with a pinion $S^2$ at the end thereof engaging the bevel gear R, and this shaft S is supported in suitable bearings 7 8 in the base A, and at the outer end of this shaft S is a crank handle or a hand wheel S' by which such shaft S can be rotated; and it will now be understood that when the shaft P has been turned to raise the pinion wrench M into gear with the teeth H and K as aforesaid, the shaft S and its bevel gear are used to rotate the bevel gear R and the pinion wrench M in either one direction or the other and either screw up the chuck and clamping ring or unscrew the same as required, and as soon as the chuck has been screwed up, the shaft P is turned to allow the pinion wrench M to descend out of the way of the chuck during the spinning operation.

In order to spread the material of the watch case lid, center, ring or other article outwardly by a spinning operation to cause such metal to fill the internal die which corresponds to the exterior shape of the article to be produced, any suitable rolls are made use of, and my patents referred to aforesaid illustrate some of the rolls or tools employed within the article to press the same outwardly into the die, and I provide a tail-stock or tool holding head D with a stock or shaft I for receiving and supporting the tool that operates within the article that is being spun, and upon the bed B is a projecting gudgeon $B^3$ receiving and supporting the tool holding head D, and it is advantageous to make the eye of the tool holding head in the form represented in Fig. 4 with a split jaw 9 and screws 10 by which the eye or cylinder of the tool holding head can be made to set around the gudgeon $B^3$ sufficiently closely to prevent vibration or looseness and at the same time to allow the tool holding head D to be rocked upon the gudgeon $B^3$ more or less as required in the spinning up of the article that is being manufactured, and this gudgeon $B^3$ being parallel to the axis of rotation the head D can be drawn back more or less upon the gudgeon to accommodate the tools made use of in the spinning operation, and the stock I can be removed with facility so as to introduce any desired character of stock or device for carrying the roller or other tool made use of.

I remark that it is advantageous to make a transverse hole through the stock I into which a lever T is inserted, such lever T projecting downwardly and resting against the side of the gudgeon $B^3$ so as to prevent the shaft or stock I being rotated in its bearing at the upper part of the tool holding head D during the operations performed by the tool, and this lever T can slide freely against the surface of the gudgeon $B^3$ as such tool holding head D is moved backward and forward upon the gudgeon, or as such tool holding head may receive a partial rotation upon the gudgeon.

In Fig. 1, I have represented upon the stock I a slide rest U carrying a roll V adapted to act within the article that is being spun, and the lever W is applied to give motion to the slide U upon its rest at the end of the stock I, so as to move the roll laterally and cause it to press within the ring or other article that is being spun up within the dies. This lever W is of sufficient length to allow the workman to apply the proper pressure by the roller V upon the interior of the article that is being spun up in the dies, and upon the base A is a lug or projection 11 through which passes a screw 12 that acts at one side of the depending lower end of the tool holding head D and by which the position of such tool holding head may be determined, the screw acting to turn the tool holding head more or less upon the gudgeon $B^3$, and such screw becomes a resistance to prevent the tool holding head turning upon the gudgeon under the pressure of the roll or other tool against the article that is being spun within the dies.

In the manufacture of elliptical rings or cases or of rings or cases that are approximately polygonal, the roll or other tool acting within the die has to receive a lateral motion sufficient to cause the metal to follow and be pressed into the die which is the shape of the article to be produced. Hence it is necessary to give to the tool holding head D a swinging movement upon the gudgeon B³, and with this object in view I provide a shaft Y passing through the base A and connected by a train of gearing $a\ b\ c\ d$ with the mandrel F, and the gear $a$ is removable from the shaft Y, and the intermediate gear $b$ is upon an adjustable stud 13 and is also changeable, and by varying the size of the gear $a$ the shaft Y can be rotated once, twice or any desired number of times for each revolution of the mandrel F according to the character or shape of the article to be spun up in the dies, and upon the lower part of the tool holding head D is a roll 14 acted upon by a cam 15 upon the end of the shaft Y. This cam 15 is to be properly shaped to give the required motion, and it will be understood that by placing a disk of cardboard or other similar material upon the end of the shaft Y and applying a pencil adjacent to the roller 14, the shape of the cam 15 can be marked out as the roll V or other tool made use of in the spinning dies is caused to follow the internal shape of the article to be produced, the tool holding head D being rocked upon the gudgeon B³ as the tool V follows such internal shape of the article to be produced. Hence when a properly shaped cam 15 is put upon the end of the shaft Y it will act upon the roll 14 and swing the tool holding head D upon the gudgeon B³ and cause the tool to follow the interior configuration of the article to be produced, the upper end of the lever W remaining almost stationary during this operation. Hence the workman does not have to move the lever $w$ backward and forward by his hand during the spinning operation, but has simply to apply through such lever sufficient pressure to the roll V to perform the spinning operation. This is a great advantage, because the muscles in the arm of the workman are not exposed to the rapid vibration and shaking action that would otherwise be inseparable from the spinning of other than circular articles, and in addition to this the work is much more perfect because the sheet metal which is under treatment in the spinning operation is not exposed to concussion from the roll or to a greater pressure at one place than at another. Hence the thickness of the article spun up is much more uniform and the ornaments that are produced by the die upon the surface of the article that is being made are much more full and perfect than has heretofore been practicable.

By the construction of this machine the operation is rendered much more perfect and the roll or tool can be moved back with facility in opening the dies for removing the finished article, or slipped forward into the dies to operate upon the article, and good work can be obtained without requiring the exercise of as much skill on the part of the workman as has heretofore been indispensable.

It will be apparent that in automatic machinery in which the die and its rotating arbor receives a lateral motion, the roll or tool that acts within the article that is being spun, might remain stationary, the automatic lateral motion being given to the dies instead of to the roll.

Where the case or center is scalloped, as in my Patent No. 362,615, a roller can be moved in and out to cause it to follow automatically the contour of the dies, the pressure being applied by hand, and then the circular snap portion of the case can be made by another roll and the circular movement only, the tool holding head remaining in a fixed position.

In consequence of the gudgeon being parallel to the axis of rotation, the tool holding head can be slid back on the gudgeon to any desired extent to bring the roll or tool into the proper position in relation to the case or other article.

This machine although primarily intended for use in spinning up watch cases, lockets and other articles of sheet metal, is also adapted to transferring ornaments from rolls or knurls to the tools in the process of making the tools or in the manufacture of knurls.

By providing a screw 20, Fig. 4, to adjust the roll 14, any wear may be compensated and the parts adjusted to suit the thickness of metal spun up in the dies.

I claim as my invention—

1. The combination with a die having an internal configuration that is not circular and corresponds to the article to be produced, of means for supporting and rotating such die, a roll for acting upon the interior of the article within such die, a support for the roll, and automatic mechanism for causing the said roll to follow the contour of the internal die, substantially as set forth.

2. The combination with a die having an internal configuration that is not circular and corresponds with the article to be produced, of means for supporting and rotating such die, a roll for acting upon the interior of the article within the die, and a support for the roll and automatic mechanism for moving the roll toward and from the axis of rotation to cause the roll to follow the contour of the internal die, substantially as set forth.

3. The combination with a die having an internal configuration that is not circular and corresponds to the article to be produced and is ornamented upon its interior surface, of means for supporting and rotating such die, a roll for acting upon the interior of the article within such die, a support for the roll and automatic mechanism for causing the said roll to follow the contour of the internal die for rolling the metal into the engraved surface of the die and maintaining a smooth interior surface, substantially as set forth.

4. The combination with the bed, mandrel, chuck and clamping ring, of a pinion wrench supported by, and sliding endwise in the bed, a spring for withdrawing the pinion, means for moving the pinion wrench endwise into contact with the chuck and clamping ring, a bevel gear with a feather upon the shaft of the pinion wrench, and a shaft and beveled pinion and means for rotating the parts in one direction or the other, substantially as set forth.

5. The combination with the bed having a projecting gudgeon, the mandrel, chuck and dies, of a tool holding head having an eye around the gudgeon, a stock passing through a hole in the upper part of the tool holding head, a roller or other tool and a slide rest upon the stock adapted to act upon the watch case center or other article within the die in spinning up the same, substantially as set forth.

6. The combination with the bed having a projecting gudgeon, the mandrel, chuck and dies, of a tool holding head, having an eye around the gudgeon, a stock supported by the upper part of the tool holding head, a roller or other tool and a slide rest upon the stock and a hand lever to give motion to the slide rest and tool to act upon the watch case center or other article within the die in spinning up the same, substantially as set forth.

7. The combination in a machine for spinning watch case centers and other articles, of a rotating mandrel, dies carried by the mandrel, a roll or other tool to act upon the metal in spinning up the same, a bed having a projecting gudgeon parallel to the axis of rotation of the mandrel, a stock carried by the tool holding head for supporting the roll or other tool, a hand lever for giving pressure by the tool upon the article, a shaft and gearing connecting the mandrel and shaft for rotating the latter, a cam carried by the shaft and acting upon the tool holding head to swing the same upon the gudgeon and cause the tool to follow the configuration of the article being made, substantially as set forth.

8. The combination with a die having an internal configuration that is not circular and corresponds to the article to be produced, of means for supporting and rotating such die, a roll for acting upon the interior of the article within such die, a support for the roll, and adjustable automatic mechanism for causing the said roll to follow the contour of the internal die, substantially as set forth.

9. The combination with a die having an internal configuration that is not circular and corresponds to the article to be produced, of means for supporting and rotating such die, a roll for acting upon the interior of the article within such die, a support for the roll, and automatic mechanism for causing the said roll to follow the contour of the internal die, and hand actuated mechanism for giving pressure by the roll, substantially as set forth.

Signed by me this 19th day of July, 1894.

F. ECAUBERT.

Witnesses:
GEO. T. PINCKNEY,
A. M. OLIVER.